United States Patent
Jalloul et al.

(10) Patent No.: US 7,729,433 B2
(45) Date of Patent: Jun. 1, 2010

(54) METHOD AND APPARATUS FOR HYBRID CDM OFDMA WIRELESS TRANSMISSION

(75) Inventors: Louay Jalloul, Santa Clara, CA (US); Tzu-Chung Frank Hsieh, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 719 days.

(21) Appl. No.: 11/564,399

(22) Filed: Nov. 29, 2006

(65) Prior Publication Data

US 2007/0211619 A1 Sep. 13, 2007

Related U.S. Application Data

(60) Provisional application No. 60/780,735, filed on Mar. 7, 2006.

(51) Int. Cl.
*H04L 27/28* (2006.01)
(52) U.S. Cl. .................................. 375/260; 375/275
(58) Field of Classification Search ............ 375/260, 375/267, 130–147; 370/203, 208, 209, 335, 370/342; 455/507–526, 73, 132, 504, 296; 342/150–155, 193–196
See application file for complete search history.

(56) References Cited

U.S. PATENT DOCUMENTS

| | | | | |
|---|---|---|---|---|
| 5,103,459 A * | 4/1992 | Gilhousen et al. | ........... | 370/206 |
| 5,619,526 A * | 4/1997 | Kim et al. | ........... | 370/335 |
| 5,926,500 A | 7/1999 | Odenwalder | ........... | 375/144 |
| 6,173,007 B1 * | 1/2001 | Odenwalder et al. | ........... | 375/146 |
| 6,285,655 B1 * | 9/2001 | Lundby et al. | ........... | 370/209 |
| 6,414,988 B1 * | 7/2002 | Ling | ........... | 375/150 |
| 6,434,375 B1 * | 8/2002 | Chulajata et al. | ........... | 455/276.1 |
| 6,493,333 B1 * | 12/2002 | Kim et al. | ........... | 370/342 |
| 6,580,750 B2 * | 6/2003 | Aue | ........... | 375/150 |
| 6,621,875 B2 * | 9/2003 | Odenwalder | ........... | 375/295 |
| 6,678,311 B2 * | 1/2004 | Odenwalder | ........... | 375/147 |
| 6,683,907 B2 * | 1/2004 | Ling | ........... | 375/147 |
| 6,794,858 B2 * | 9/2004 | Ishii | ........... | 324/76.78 |
| 6,795,488 B1 * | 9/2004 | Iwakiri | ........... | 375/148 |
| 6,842,477 B2 * | 1/2005 | Odenwalder et al. | ........... | 375/146 |
| 6,922,389 B1 * | 7/2005 | Lundby | ........... | 370/209 |
| 7,031,282 B2 * | 4/2006 | Lundby et al. | ........... | 370/335 |
| 7,221,653 B2 * | 5/2007 | Vanghi | ........... | 370/252 |
| 7,289,771 B2 * | 10/2007 | Davis | ........... | 455/69 |
| 7,308,033 B2 * | 12/2007 | Yu et al. | ........... | 375/260 |
| RE40,385 E * | 6/2008 | Bang et al. | ........... | 375/141 |
| 7,460,506 B2 * | 12/2008 | Ro et al. | ........... | 370/335 |
| 2003/0031195 A1 * | 2/2003 | Okawa et al. | ........... | 370/441 |
| 2004/0081111 A1 * | 4/2004 | Bae et al. | ........... | 370/316 |
| 2004/0218559 A1 * | 11/2004 | Kim et al. | ........... | 370/318 |
| 2005/0169301 A1 * | 8/2005 | Jain et al. | ........... | 370/464 |
| 2005/0226141 A1 * | 10/2005 | Ro et al. | ........... | 370/203 |
| 2005/0265293 A1 * | 12/2005 | Ro et al. | ........... | 370/335 |

(Continued)

*Primary Examiner*—Chieh M Fan
*Assistant Examiner*—Santiago Garcia (57) ABSTRACT

A method and apparatus for wireless transmission from a mobile unit to a base station includes multiplexing a pilot signal and a data signal, wherein the data signal operates at a data rate by splitting the data signal into a plurality of data streams; applying a pilot gain to the pilot channel, wherein the data gain and the pilot gain are a function of the data rate; and combining the plurality of data streams and the pilot signal into a subset of sub-carriers. The subset of sub-carriers are transmitted using Discrete Fourier Transform Spread OFDMA.

19 Claims, 8 Drawing Sheets

U.S. PATENT DOCUMENTS

| | | | |
|---|---|---|---|
| 2006/0002360 A1* | 1/2006 | Ji et al. | 370/343 |
| 2006/0229091 A1* | 10/2006 | Rezaiifar et al. | 455/509 |
| 2006/0262840 A1* | 11/2006 | Wang et al. | 375/221 |
| 2007/0015476 A1* | 1/2007 | Akbar Attar et al. | 455/127.1 |
| 2007/0036179 A1* | 2/2007 | Palanki et al. | 370/491 |
| 2007/0041404 A1* | 2/2007 | Palanki et al. | 370/479 |
| 2007/0041457 A1* | 2/2007 | Kadous et al. | 375/260 |
| 2007/0097942 A1* | 5/2007 | Gorokhov et al. | 370/342 |

\* cited by examiner

METHOD AND APPARATUS FOR HYBRID CDM OFDMA WIRELESS TRANSMISSION

RELATED APPLICATIONS

This application claims the benefit of U.S. Provisional Application No. 60/780,735, filed Mar. 7, 2006.

BACKGROUND OF INVENTION

In order for a receiver to coherently demodulate data signal, a known signal called a pilot signal is used. In the case of Orthogonal Frequency Division Multiplexing (OFDM), the pilot signal has been added in time and frequency. A set of pilot signals (often called pilot tones) and time slots must be reserved in order to do frequency domain estimation of the channel transfer response. The number of pilot signals needs to be large enough to yield a reliable prediction of channel response at the tones used for transporting data. The pilot signal is an overhead in the system and therefore, only adequate allocation of pilot signals and time slots are needed to obtain a good channel estimation which facilitates data demodulation. For the uplink or reverse link access (i.e., mobile unit to base transmission), pilot signaling may occupy a large portion of sub-carriers when many users are simultaneously transmitting since each mobile unit needs to transmit its own pilot signal. This causes the overall wireless system throughput to be significantly reduced if there exists many low data rate users.

Accordingly, it would be highly desirable to have method and apparatus that addresses the deficiencies found in the prior art.

BRIEF DESCRIPTION OF THE DRAWINGS

Representative elements, operational features, applications and/or advantages of the present invention reside inter alia in the details of construction and operation as more fully hereafter depicted, described and claimed—reference being made to the accompanying drawings forming a part hereof, wherein like numerals refer to like parts throughout. Other elements, operational features, applications and/or advantages will become apparent in light of certain exemplary embodiments recited in the Detailed Description, wherein:

Elements in the Figures are illustrated for simplicity and clarity and have not necessarily been drawn to scale. For example, the dimensions of some of the elements in the Figures may be exaggerated relative to other elements to help improve understanding of various embodiments of the present invention. Furthermore, the terms "first", "second", and the like herein, if any, are used inter alia for distinguishing between similar elements and not necessarily for describing a sequential or chronological order. Moreover, the terms "front", "back", "top", "bottom", "over", "under", and the like in the Description and/or in the Claims, if any, are generally employed for descriptive purposes and not necessarily for comprehensively describing exclusive relative position. Any of the preceding terms so used may be interchanged under appropriate circumstances such that various embodiments of the invention described herein may be capable of operation in other configurations and/or orientations than those explicitly illustrated or otherwise described.

DETAILED DESCRIPTION OF EXEMPLARY EMBODIMENTS

The following representative descriptions of the present invention generally relate to exemplary embodiments and the inventor's conception of the best mode, and are not intended to limit the applicability or configuration of the invention in any way. Rather, the following description is intended to provide convenient illustrations for implementing various embodiments of the invention. As will become apparent, changes may be made in the function and/or arrangement of any of the elements described in the disclosed exemplary embodiments without departing from the spirit and scope of the invention.

For clarity of explanation, the embodiments of the present invention are presented, in part, as comprising individual functional blocks. The functions represented by these blocks may be provided through the use of either shared or dedicated hardware, including, but not limited to, hardware capable of executing software. The present invention is not limited to implementation by any particular set of elements, and the description herein is merely representational of one embodiment.

The terms "a" or "an", as used herein, are defined as one, or more than one. The term "plurality," as used herein, is defined as two, or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The terms "program," "software application," and the like as used herein, are defined as a sequence of instructions designed for execution on a computer system. A program, computer program, or software application may include a subroutine, a function, a procedure, an object method, an object implementation, an executable application, an applet, a servlet, an object code, a shared library/dynamic load library and/or other sequence of instructions designed for execution on a computer system. A component may include a computer program, software application, or one or more lines of computer readable processing instructions.

Software blocks that perform embodiments of the present invention can be part of computer program modules comprising computer instructions, such control algorithms that are stored in a computer-readable medium such as memory. Computer instructions can instruct processors to perform any methods described below. In other embodiments, additional modules could be provided as needed.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A wireless network in accordance with the present invention is described in terms of several preferred embodiments, and particularly, in terms of a wireless network operating in accordance with at least one of several standards. These standards may include analog, digital or dual-mode communication system protocols such as Frequency Division Multiple Access (FDMA), the IS-95 Code Division Multiple Access (CDMA) digital cellular, Wideband Code Division Multiple Access (WCDMA), CDMA 2000, Personal Communications System (PCS), 3G, 3GPP, and variations and evolutions of these protocols.

Figure 1:
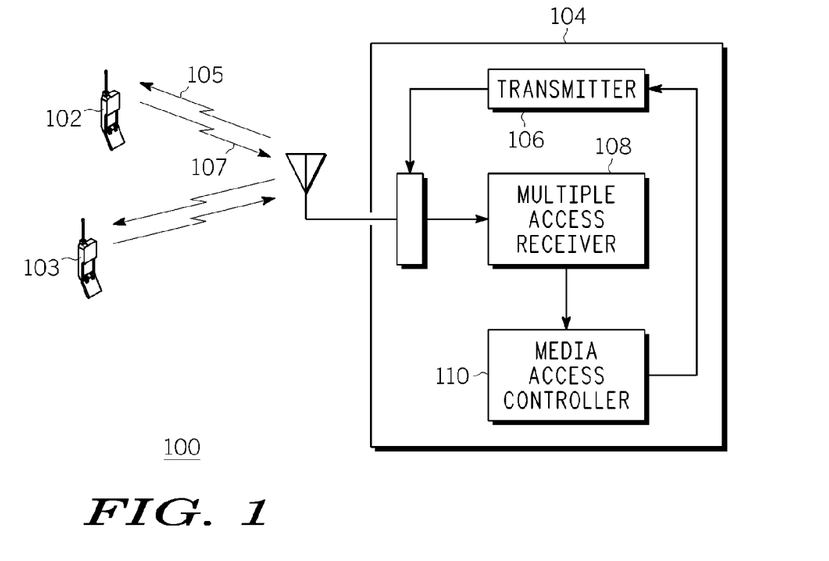
FIG. 1 representatively illustrates a wireless network in accordance with an exemplary embodiment of the present invention.

FIG. 1 representatively illustrates a wireless network 100 in accordance with an exemplary embodiment of the present invention. The present invention deals with an improvement of multiple access systems. In this example, communication with multiple mobile units 102, 103 may be performed through a wireless medium. The allocated frequency channel is shared among the mobile units 102, 103, according to a medium access policy governed by the base station 104. The channel resource is partitioned into quanta, and those are allocated to the mobile units 102, 103 according to the traffic demand. The partitioning of the channel resource can be performed in many manners—Time Division Multiple Access (TDMA), in which time slots are assigned, Frequency Division Multiple Access (FDMA) in which frequency subchannels are assigned, Code Division Multiple Access (CDMA), in which coded signature waveforms are assigned, or, as in present invention, by specially designed combination of one or more of the above.

The main elements of base station 104 may include a downstream transmitter 106, a multiple access receiver 108, and a Media Access Controller (MAC) 110. The MAC 110 at the base station 104 decides how to allocate the upstream channel resource to the base station 104 and inserts into the downstream control information to the mobile units 102, 103. In parallel with informing the base station 104 how to transmit the information, MAC 110 may inform multiple access receiver 108 how to extract the information from the received signal (at what time, in which frequency subchannel etc.) and where to send the received information. Some of the received information may serve MAC 110 for deciding on future allocation policy.

Wireless network 100 may further include mobile units 102, 103 coupled to base station 104 via wireless links. In an embodiment, wireless links may include a forward link 105 for communications from base station 104 to mobile unit 102, and a reverse link 107 for communications from mobile unit 102 to base station.

Due to the asymmetric nature of packet traffic, the requirements for reverse link 107 and forward link 105 are quite different. High throughput/spectral efficiency is of paramount importance in the traffic-heavy forward link 105, even if it means more involved hardware and higher cost power amplifiers at base-station 104. On the other hand, amplifier efficient modulation schemes are critical to mobile unit 102, in order to reduce cost and improve power efficiency. Clearly, separate design optimization approaches must be adopted for the design of reverse link 107 and forward link 105 schemes. However almost all current systems, e.g. IS-95 networks, utilize a uniform, multiple-access structure for both reverse link 107 and forward link 105. As a result, the efficiency of the overall wireless network 100 is compromised.

A challenging aspect of designing advanced wireless networks is the development of a flexible and efficient physical layer modulation scheme. Some of the desirable attributes of a physical layer include: moderate peak-to-average power ratio, to reduce the cost, size, and power consumption of mobile unit power amplifiers; support for a wide range of data rates, and the ability to vary data rates based on received signal quality; support for adaptive modulation; limiting inter-block interference in multi-path channels; support for frequency diversity of wideband channels, even when transmitting at "narrowband" data rates; and the ability to maintain orthogonality between transmissions by different users in a cell, in order to minimize intra-cell interference and maximize capacity. The present invention provides these desirable attributes in a wireless network.

Figure 2:
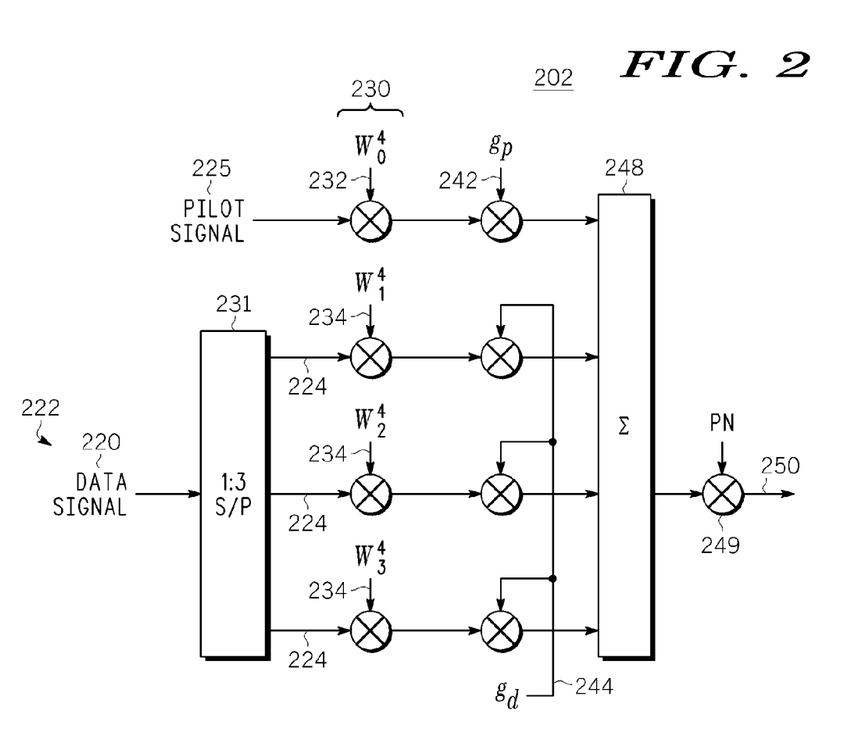
FIG. 2 representatively illustrates a mobile unit in accordance with an exemplary embodiment of the present invention.

FIG. 2 representatively illustrates a mobile unit 202 in accordance with an exemplary embodiment of the present invention. In the mobile unit 202 of FIG. 2, both the pilot signal 225 and the data signal 220 are multiplexed to the same subset of sub-carriers. In an embodiment, pilot signal 225 and data signal 220 may be code division multiplexed into a subset of sub-carriers as described herein.

Pilot signal 225 is a signal that has no data, that is, the data is predetermined to be all "0" bits. Pilot signal 225 may be used for demodulation and channel estimation by, for example, a receiver, and the like. The data signal 220 may be input at a variety of data rates 222 from the minimum to the maximum rate supported by the communication system. Data signal 220, unlike pilot signal 225, actually carries information. Data rate 222 may also be known in the art as a data symbol rate, and the like.

In an embodiment, data signal 220 may be split into a plurality of data streams 224, using for example, a serial to parallel converter 231. Although data signal 220 is shown being split into three data streams, this is not limiting of the invention. Data signal 220 may be split into any number of data streams 224 and be within the scope of the invention. Each data stream 224 and the pilot signal 225 may be spreading using a plurality of orthogonal Walsh codes 230. For example, pilot signal 225 may be spread using pilot Walsh code 232, and each of plurality of data streams 224 may be spread using a separate data Walsh code 234. Each of plurality of orthogonal Walsh codes 230 shall be substantially orthogonal to each other. For example, data Walsh codes 234 and pilot Walsh code 232 shall all be substantially orthogonal to each other. Further, plurality of orthogonal Walsh codes 230 may be any size Walsh code. For example, plurality of orthogonal Walsh codes 230 may be 4-bit Walsh codes, 8-bit Walsh codes, and the like. In an embodiment, data Walsh codes 234 may be a different size than pilot Walsh code 232. For example, data Walsh codes 234 may be 4-bit Walsh codes, while pilot Walsh code 232 may be an 8-bit Walsh code.

A gain may be differentially applied to each of plurality of data streams 224 and pilot signal 225. For example, a data gain 244 may be applied to each of plurality of data streams 224, and a pilot gain 242 may be applied to pilot signal 225. In an embodiment, data gain 244 and pilot gain 242 are a function of data rate 222. In other words, the amount of data gain 244 and pilot gain 242 applied may be a function of the data rate 222 and differentially adjusted based on the data gain 244. For example, an increasing data rate 222 may cause the pilot gain 242 to decrease while causing the data gain 244 to increase. Also, a decreasing data rate 222 may cause pilot gain 242 to increase while causing data gain 244 to decrease. Optimal gains for the plurality of data streams 224 and the pilot signal 225 may depend on the data rate 222.

If data rate 222 is high (send a lot of data symbols per unit time), then more pilot symbols are needed as well. However, pilot gain 242 only needs to be high enough for channel estimation. Any further increase in pilot gain 242 would be a waste of power and detract from the data gain 244 needed for the higher data rate 222 and perhaps induce data errors from channel distortion. Therefore, once pilot gain 242 reaches a threshold for adequate channel estimation, no further increase in pilot gain 242 is needed. For an increasing data rate 222, pilot gain 242 may decrease to a threshold level, while data gain 244 is increased for the higher data throughput required. On the other hand, if data rate 222 is decreasing, there is less data throughput and hence less data gain 244 required. In this embodiment, data gain 244 may be decreased while pilot gain 242 is increased. This will give very good channel estimation (with a higher pilot gain 242), while still allocating sufficient data gain 244 to plurality of data streams 224.

Subsequent to spreading and application of pilot gain 242 and data gain 244, both pilot signal 225 and plurality of data streams 224 are combined or multiplexed by a summing unit 248. The combined signal is then spread with a common short code, or PN sequence 249, to produce a multiplexed signal 250, which contains both the pilot signal 225 and the data signal 220. The multiplexed signal is then allocated to a subset of sub-carriers as shown and described below. Multiplexed signal 250 differs from the prior art of having separate sub-carriers for the pilot signal 225 and the data signal 220.

Figures 3, 4:
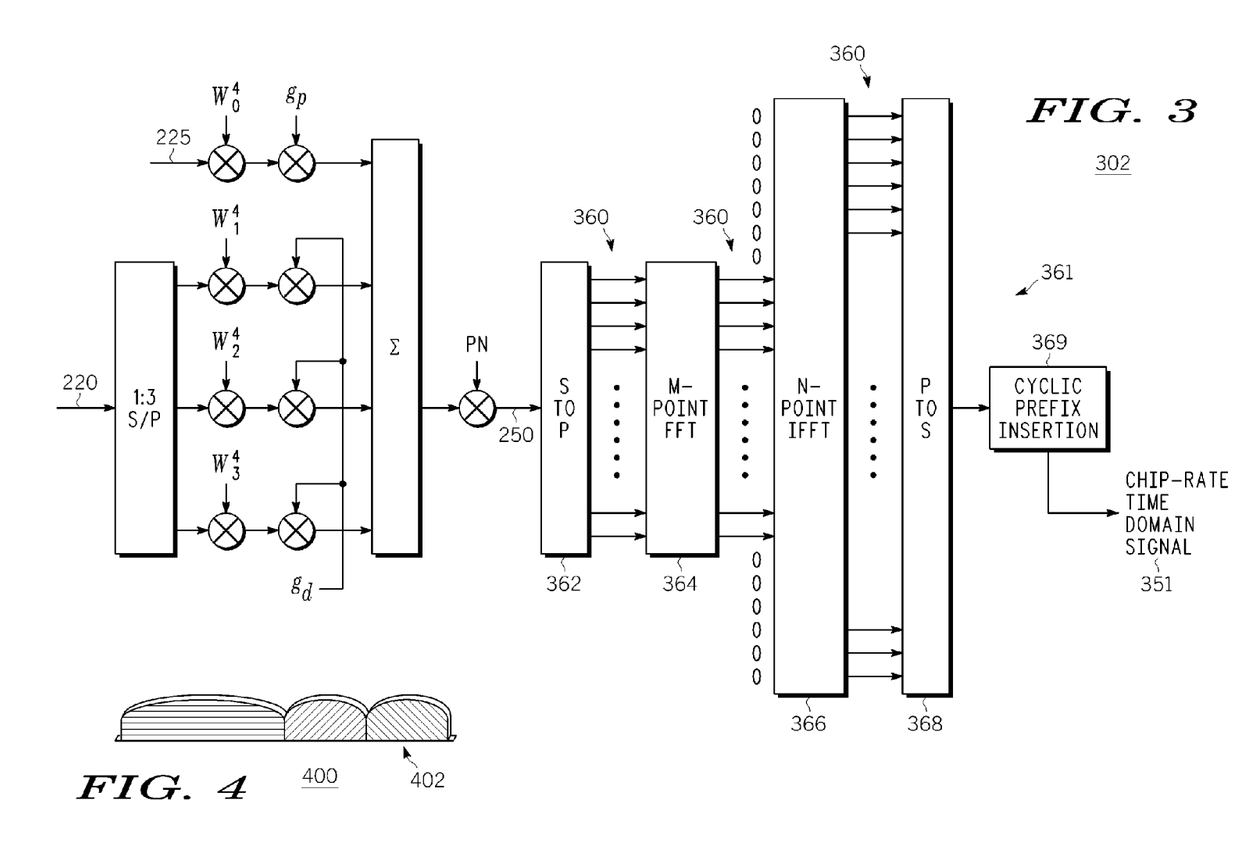
FIG. 3 representatively illustrates a mobile unit in accordance with another exemplary embodiment of the present invention.
FIG. 4 representatively illustrates a frequency domain in accordance with another exemplary embodiment of the present invention.

FIG. 3 representatively illustrates a mobile unit 302 in accordance with another exemplary embodiment of the present invention. The mobile unit 302 of FIG. 3 is represented as feeding multiplexed signal 250, containing both pilot signal 225 and data signal 220 (in the form of plurality of data streams 224), into a series of units for allocating multiplexed signal 250 to a subset of sub-carriers 360 for transmission using Discrete Fourier Transform (DFT) spread Orthogonal Frequency Division Multiple Access (OFDMA) 361. In an embodiment, multiplexed signal 250 is a code division multiplexed signal combining pilot signal 225 and plurality of data streams 224.

Orthogonal frequency division multiplexing (OFDM) and direct-sequence spread spectrum (DSSS), such as CDMA, are two modulation techniques frequently used for wireless communications. In OFDM, a wide bandwidth is divided into multiple narrow-band sub-carriers, which are arranged to be orthogonal with each other. The signals modulated on the sub-carriers are transmitted in parallel. In DSSS, a modulation symbol is first spread across the entire available bandwidth by a spreading sequence and then transmitted. In code-division multiple access (CDMA), multiple subscriber stations communicate with a base stations using DSSS signaling with different spreading sequences.

OFDM is a multi-carrier modulation technique that effectively partitions the overall system bandwidth into multiple (N) orthogonal sub-bands. These sub-bands may also be referred to as tones, sub-carriers, bins, and frequency channels. With OFDM, each sub-band is associated with a respective sub-carrier that may be modulated with data. Up to N modulation symbols may be transmitted on the N sub-bands in each OFDM symbol period.

OFDM is an efficient technique for multi-path fading channels. In a well-designed system, the frequency response of each sub-carrier can be made flat or near flat. Therefore, only very simple or even no channel equalization is required. Another significant advantage of OFDM is that it allows an optimal power and rate allocation to maximize the channel capacity. This inherent advantage is even more significant in a cellular system with multiple subscribers where the channel response of each subscriber is different. In this case, it is possible to maximize the entire system capacity throughput by judicious allocations of sub-carriers to multiple subscribers.

On the other hand, OFDM also possesses some disadvantages. One of the disadvantages is the large peak-to-average power (PAP) ratio of the OFDM signals. This is a significant hurdle for implementing OFDM-based systems. A large PAP ratio means more stringent linearity requirements on the power amplifier or large back off, leading to higher cost or lower transmission power. This is especially undesirable for the implementation of mobile units, which dominates the system cost due to their large quantity. In addition, to achieve the maximum capacity of OFDM with adaptive sub-carrier allocation, it is often required to feedback the channel measurement at the mobile units to the base station. This can also add overhead and complicate the system control.

DSSS often deals with the multi-path channel through the use of so-called Rake receiver, which coherently adds together the signals received from multiple delay paths. However, when the data rate is high and the spreading factor is low, the performance of the Rake receiver degrades. Furthermore, a DSSS signal equally utilizes the entire spectrum, including both high-gain frequencies and low-gain frequencies. Therefore, the potential capacity of DSSS is less than that achieved by OFDM with adaptive sub-carrier allocation. On the other hand, a DSSS signal typically has lower PAP than an OFDM signal. In addition, the use of DSSS enables code-division multiple-access that provides great multiple-access flexibility among many multiple-access schemes. Therefore, DSSS is still a very attractive technique especially for mobile unit transmission.

OFDM and DSSS both are widely used in wireless communications, but in most systems, a single technology is used for both downlink and uplink. For example, in the UMTS W-CDMA system, DSSS is used for both downlink and uplink, while in IEEE 802.11a, OFDM is used for both downlink and uplink. This means the advantages and disadvantages are both present in the system. For more information on W-CDMA, see H. Holma and A. Toskala, "WCDMA for UMTS," John Wiley & Sons, Inc., 2000. For more information on OFDM, see R. van Nee and R. Prasad, "OFDM for Wireless Multimedia Communications," Artech House Publishers, 2000; Cimini, Jr., "Analysis and Simulation of a Digital Mobile Channel Using Orthogonal Frequency Division Multiplexing," IEEE Trans. Commun., vol. COM-33, no. 7, July 1985, pp. 665-75; Chuang and Sollenberger, "Beyond 3G: Wideband Wireless Data Access Based on OFDM and Dynamic Packet Assignment," IEEE Communications Magazine, Vol. 38, No. 7, pp. 78-87, July 2000.

Orthogonal frequency division multiple access (OFDMA) is another method for multiple access, using the basic format of OFDM. In OFDMA, multiple mobile units simultaneously use different sub-carriers, in a fashion similar to frequency division multiple access (FDMA). An OFDMA system utilizes OFDM and can support multiple users simultaneously. For a frequency hopping OFDMA system, data for each user is transmitted using a specific frequency hopping sequence assigned to the user. The frequency hopping sequence indicates the specific sub-band to use for data transmission in each hop period. Multiple data transmissions for multiple users may be sent simultaneously using different frequency hopping sequences. These frequency hopping sequences are defined to be orthogonal to one another so that only one data transmission uses each sub-band in each hop period. By using orthogonal frequency hopping sequences, intra-cell interference is avoided, and the multiple data transmissions do not interfere with one another while enjoying the benefits of frequency diversity. For more information on OFDMA, see Sari and Karam, "Orthogonal Frequency-Division Multiple Access and its Application to CATV Networks," European Transactions on Telecommunications, Vol. 9 (6), pp. 507-516, November/December 1998 and Nogueroles, Bossert, Donder, and Zyablov, "Improved Performance of a Random OFDMA Mobile Communication System,", Proceedings of IEEE VTC'98, pp. 2502-2506.

As shown in FIG. 3, multiplexed signal 250 is fed to a serial to parallel converter 362 to create subset of sub-carriers 360, which are then transferred to a Fast Fourier Transform (FFT) unit 364, that transforms subset of sub-carriers 360 into the frequency domain. FFT unit 364 is coupled to generate a subset (M) of sub-carriers (N). In other words, FFT unit 364 spreads multiplexed signal 250 over a subset (M) (less than all) of the total amount of sub-carriers (N) available. Here, 0 is placed at extra sub-carriers. Next, an Inverse Fast Fourier Transform (IFFT) unit 366 transforms subset of sub-carriers into the time domain with respect to the number of sub-carriers, which has been varied depending on the number of rearranged parallel signals. The FFT unit 364 transforms the time domain signal into its equivalent frequency spectrum. This is done by finding the equivalent waveform, generated by a sum of orthogonal sinusoidal components. The amplitude and phase of the sinusoidal components represent the frequency spectrum of the time domain signal. The IFFT unit 366 performs the reverse process, transforming a spectrum (amplitude and phase of each component) into a time domain signal. Then, subset of sub-carriers 360 are arranged in order of time by parallel to serial converter 368. Cyclic prefix insertion 369 is then performed to obtain a chip-rate cyclic time domain signal 351 for transmission on reverse link 107.

Figure 6:
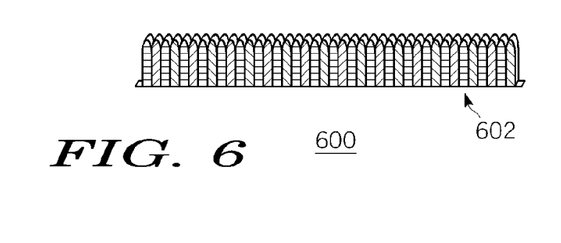
FIG. 6 representatively illustrates a frequency domain in accordance with still another exemplary embodiment of the present invention.

With DFT spread OFDMA 361, subset of sub-carriers 360 may be distributed or localized in the frequency domain. FIG. 4 representatively illustrates a frequency allocation for multiple users 400 in accordance with another exemplary embodiment of the present invention. As shown, subset of sub-carriers for each user 402 may be localized in the frequency domain 400. In another embodiment, the subset of sub-carriers for each user 402 may be distributed in any way about frequency domain 400, either uniformly as shown in FIG. 6, non-uniformly, or with subset of sub-carriers for each user 402 not adjacent to each other.

Figure 5:
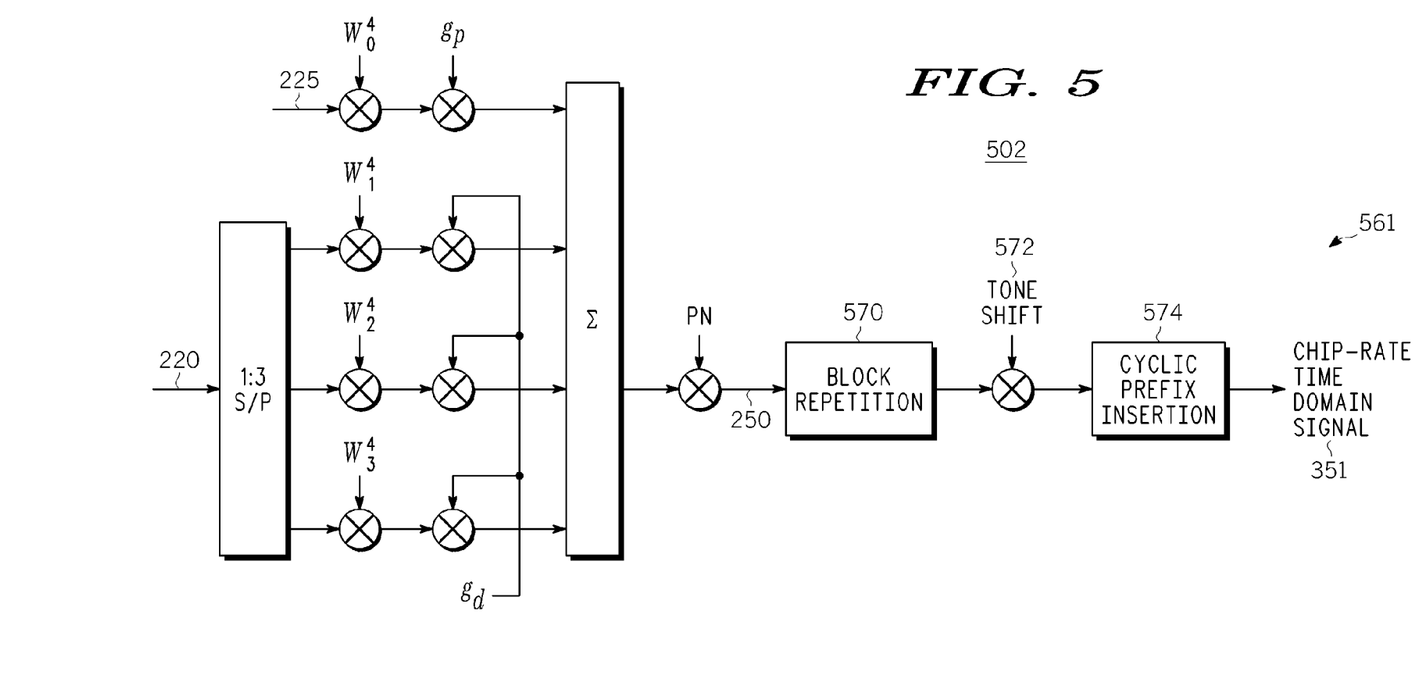
FIG. 5 representatively illustrates a mobile unit in accordance with yet another exemplary embodiment of the present invention.

FIG. 5 representatively illustrates a mobile unit 502 in accordance with yet another exemplary embodiment of the present invention. The mobile unit 502 of FIG. 5 is represented as feeding multiplexed signal 250, containing both pilot signal 225 and data signal 220 (in the form of plurality of data streams 224), into a series of units for allocating multiplexed signal 250 to a subset of sub-carriers for transmission using a derivative of Discrete Fourier Transform (DFT) spread Orthogonal Frequency Division Multiple Access (OFDMA), in this case Interleaved Frequency Division Multiple Access (IFDMA) 561. In an embodiment, multiplexed signal 250 is a code division multiplexed signal combining pilot signal 225 and plurality of data streams 224.

IFDMA is based on compression and periodic repetition of a given data vector. Compression and repetition cause an equally spaced distribution of sub-carriers in the frequency domain with zero-points in-between where carriers of other users can be positioned. For accurate positioning of different user signals the compressed and repeated data vector is shifted in frequency domain by a user specific factor. Hence, under ideal conditions signals of different users are orthogonal. IFDMA-signals feature good power efficiency due to their constant envelope, and user separation for IFDMA is less complex compared to CDMA-based systems. Like OFDM, IFDMA is sensitive to frequency synchronization errors and uses guard intervals to avoid inter block interference.

IFDMA takes some of the desirable characteristics of both OFDM and single carrier modulation and combines them into an improved type of modulation. With IFDMA, the baseband signal may begin as a single-carrier quadrature phase shift keying (QPSK) or quadrature amplitude modulation (QAM) symbol stream. Since IFDMA starts as a single carrier scheme (prior to blocking and repetition), it has the same peak-to-average ratio as single carrier modulation, and provides frequency diversity. However, in the IFDMA scheme, every user must transmit on equally-spaced sub-carriers. Additionally, the ability to frequency hop is non-existent. This prevents the use of different data rates by different users and limits the flexibility of IFDMA.

With IFDMA, the multiplexed signal 250 may begin as a single-carrier phase shift keying (PSK) or quadrature amplitude modulation (QAM) symbol stream. The symbols are grouped into blocks which are repeated L times (block repetition unit 570) prior to filtering (typically with a root-raised cosine filter) and transmission, where L is an integer. The repetition of the symbol blocks causes the spectrum of transmitted signal to be non-zero only at certain sub-carrier frequencies (namely, every L.th sub-carrier). Thus, the transmitted signal spectrum before pulse shaping is similar to what would be seen if data symbols were only modulated on every L.th sub-carrier of an orthogonal frequency division modulation (OFDM) signal. Since the signal occupies only one of every L sub-carriers, a total of L different users using the same number of sub-carriers can transmit simultaneously. The repeated signal from block repetition unit 570 may be tone shifted 572 in frequency domain by a user specific factor (tone multiplier) to allow for positioning of signals from multiple mobile units. Cyclic prefix insertion 574 is then performed to obtain a chip-rate cyclic time domain signal 351 for transmission on reverse link 107.

The IFDMA transmissions remain orthogonal as long as: 1) they occupy different sets of sub-carriers, which is accomplished by IFDMA user-specific modulation codes (tone shift 572), 2) a cyclic extension (or guard period) is added to the transmission, where the cyclic extension is longer than the channel pulse response, and 3) the signals are synchronized with a receiver in time.

FIG. 6 representatively illustrates a frequency domain in accordance with still another exemplary embodiment of the present invention. With IFDMA 561, subset of sub-carriers are substantially uniformly distributed in the frequency domain. FIG. 6 representatively illustrates a frequency allocation for multiple users 600 in accordance with another exemplary embodiment of the present invention. As shown, subset of sub-carriers for each user 602 is substantially uniformly distributed in the frequency domain 600.

Figure 7:
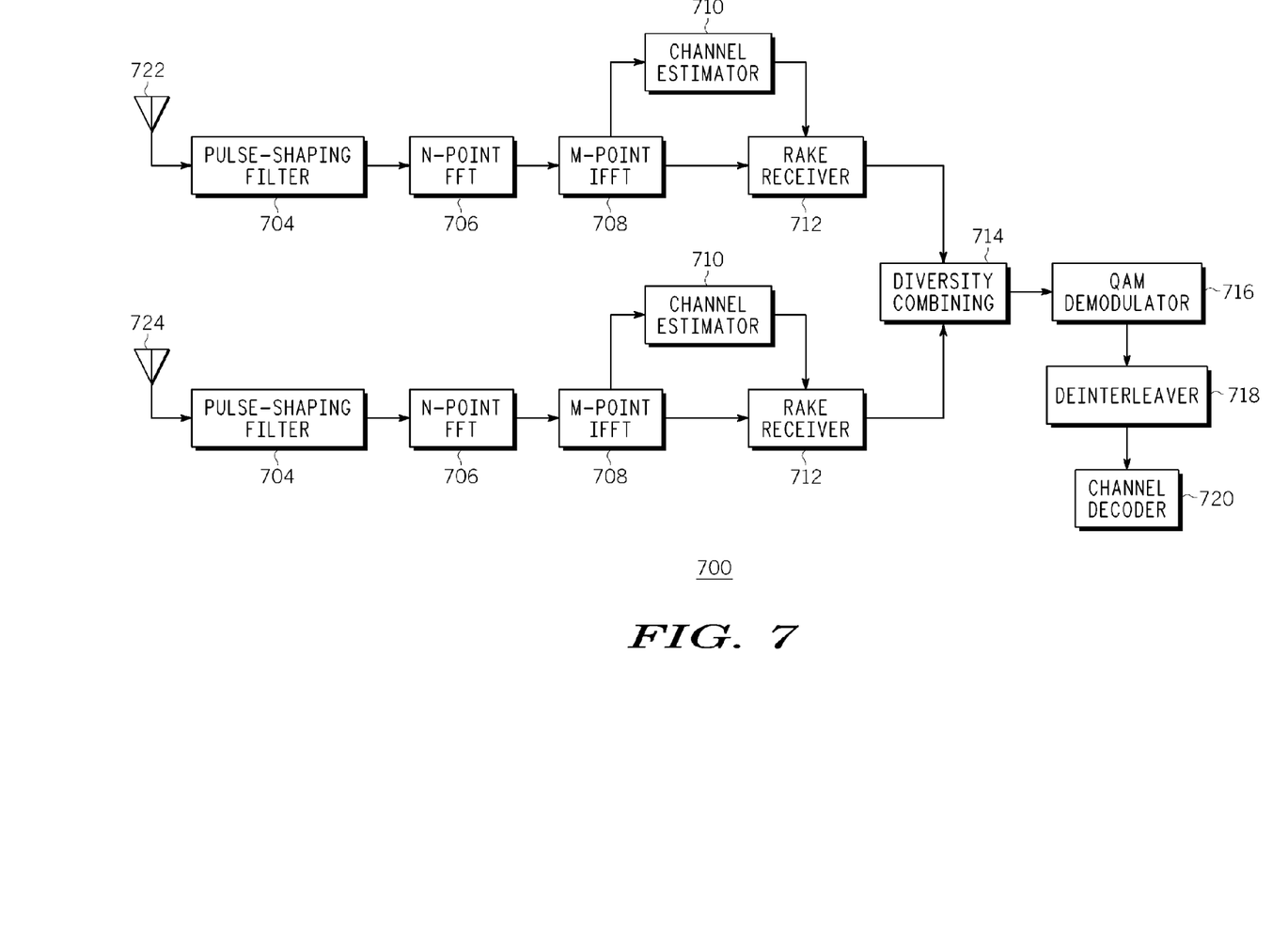
FIG. 7 representatively illustrates a receiver in accordance with an exemplary embodiment of the present invention.

FIG. 7 representatively illustrates a receiver 700 in accordance with an exemplary embodiment of the present invention. In an embodiment, receiver 700 is coupled to receive a subset of sub-carriers transmitted from a mobile unit using DFT spread OFDMA or IFDMA.

In an embodiment, signals of all sub-carriers within the frequency band are received at first receiving antenna 722 and second receiving antenna 724. Subset of sub-carriers received at first and second receiving antenna may be from the same mobile unit with each antenna receiving from different propagation paths. The received signals are sampled sequentially in time via pulse shaping filter 704, with the samples being stored in memory. Filter 704 may operate to extract subset of sub-carriers created as described above. The outputs of filter 704 are received by inputs of Fast Fourier Transform (FFT) unit 706, which applies a Fast Fourier Transform to transform the time-domain signal of the entire frequency band into the frequency domain (of N modulation symbols). This operation may be performed for all sub-carriers, not just subset of sub-carriers. The outputs of FFT unit 706 may then be sent to Inverse Fast Fourier Transform (IFFT) unit 708, which selects the frequency-domain signal (of M modulation symbols) used by the mobile unit from all available sub-carriers and applies an Inverse Fast Fourier Transform to transform subset of sub-carriers into the time domain.

The received signal samples may be input to a correlator (not shown for clarity), which despreads the samples using the same spreading sequence that was used during transmit and correlates the incoming signal with a mobile unit's spreading code. In an alternative embodiment, correlator may be replaced with a match filter. Signals may be input to Rake receiver 712 and channel estimator 710. The output of IFFT unit 708 is input into channel estimator 710 so that channel estimation is done on signals in the time domain. Rake receiver 712 processes the correlation result via maximum ratio combining in a manner well-known in the art, and outputs the processed result to diversity combiner 714. In an embodiment, diversity combiner 714 takes output of rake receiver 712 (despread data sequence corrected for channel distortion) and combines in a way that maximized signal to noise ratio (maximal ratio combining).

QAM demodulator 716 performs demodulation as known in the art. Deinterleaver 718 performs de-interleaving and outputs the unscrambled data to channel decoder 720, which performs Forward Error Correction (FEC) decoding in a manner well-known in the art. The output of channel decoder 720 is the received information bits.

Figure 8:
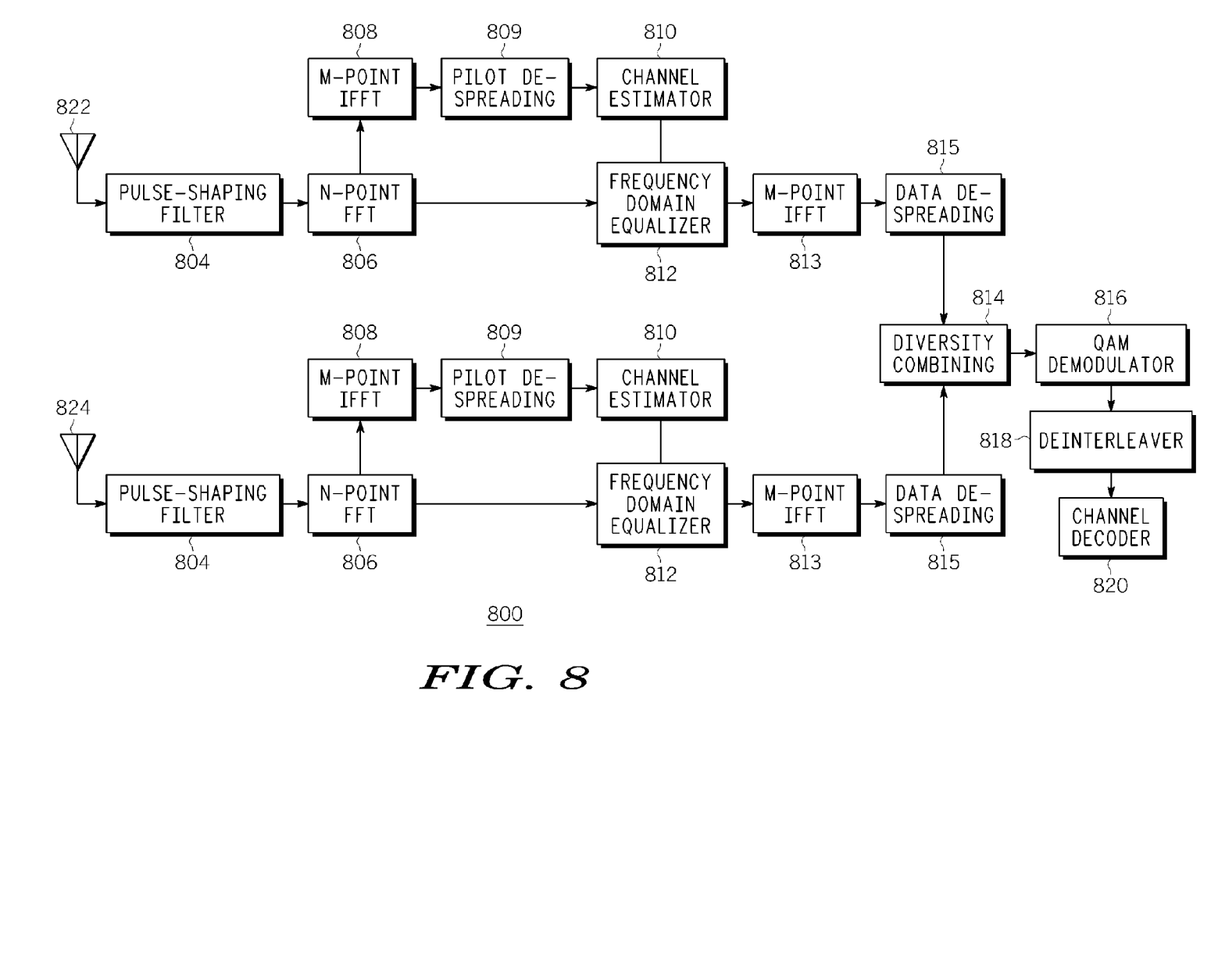
FIG. 8 representatively illustrates a receiver in accordance with another exemplary embodiment of the present invention.

FIG. 8 representatively illustrates a receiver 800 in accordance with another exemplary embodiment of the present invention. In an embodiment, receiver 800 is coupled to receive a subset of sub-carriers transmitted from a mobile unit using DFT spread OFDMA or IFDMA.

In an embodiment, signals of all sub-carriers within the frequency band are received at first receiving antenna 822 and second receiving antenna 824. Subset of sub-carriers received at first and second receiving antenna may be from the same mobile unit with each antenna receiving from different propagation paths. The received signals are sampled sequentially in time via pulse shaping filter 804, with the samples being stored in memory. Filter 804 may operate to extract subset of sub-carriers created as described above. The outputs of filter 804 are received by inputs of Fast Fourier Transform (FFT) unit 806, which applies a Fast Fourier Transform to transform the time-domain signal of the entire frequency band into the frequency domain (of N modulation symbols). This operation may be performed for all sub-carriers, not just subset of sub-carriers. The outputs of FFT unit 806 may then be sent to Inverse Fast Fourier Transform (IFFT) unit 808, which selects the frequency-domain signal (of M modulation symbols) used by the mobile unit from all available sub-carriers and applies an Inverse Fast Fourier Transform to transform subset of sub-carriers into the time domain. The output of FFT unit 806 is also sent to frequency domain equalizer 812.

Pilot despreader 809 despreads the narrow-band time domain signal from IFFT unit 808 by multiplying the signal with the PN sequence and pilot Walsh code. The resultant pilot symbols are used for channel estimation (channel estimation accomplished in the time domain). The output of the channel estimator 810 is the frequency response (which represents channel distortion) at the M sub-carriers used by the mobile unit. The frequency responses are then used by the frequency domain equalizer (FDE) 812 to equalize (i.e., correct the channel distortion) the distorted signal in the frequency domain. Equalized freq-domain signal is then fed into the IFFT unit 813 to be transformed into time domain signal (different from the IFFT unit 808 for channel estimation is that now the signal is more clean and reliable). Data despreader 815 despreads data by multiplying the time-domain signal with PN sequence and data Walsh codes. Data despreader 815 outputs the processed result to diversity combiner 814, which combines in a way that maximized signal to noise ratio (maximal ratio combining).

QAM demodulator 816 performs demodulation as known in the art. Deinterleaver 818 performs de-interleaving and outputs the unscrambled data to channel decoder 820, which performs Forward Error Correction (FEC) decoding in a manner well-known in the art. The output of channel decoder 820 is the received information bits.

Figure 9:
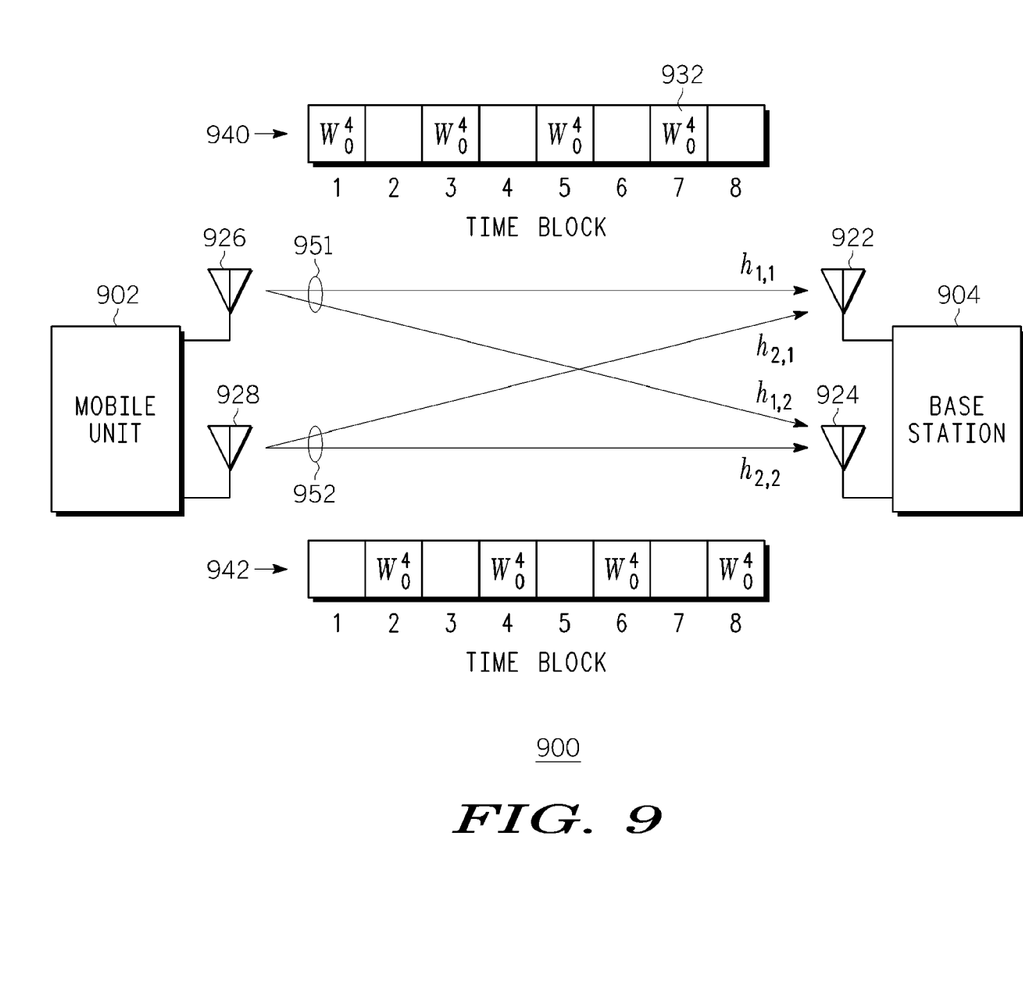
FIG. 9 representatively illustrates a wireless network in accordance with another exemplary embodiment of the present invention.

FIG. 9 representatively illustrates a wireless network 900 in accordance with another exemplary embodiment of the present invention. Wireless network 900 may include at least one mobile unit 902 wirelessly coupled to a base station 904.

The embodiment, of FIG. 9 illustrates a pilot signal design for multiple antenna transmission and reception, which is an optional embodiment of the invention. Mobile unit may include first transmitting antenna 926 and a second transmitting antenna 928 coupled to transmit first wireless signal 951 and second wireless signal 952 respectively. First wireless signal 951 and second wireless signal 952 may include subset of sub-carriers as described above.

In multiple antenna transmission as shown in FIG. 9, signals from different transmitting antennas can be space-time coded to provide more diversity (as in transmit diversity, different antennas transmit same data) or provide higher throughput (as in Multiple Input Multiple Output (MIMO) antenna configurations where different antennas transmit different data). In the present embodiment, separate pilot signals from different antennas are needed in order for the base station receiver to estimate channel associated each transmit-receive antenna pair. Although two antennas are shown for both the mobile unit 902 and the base station 904, this is not limiting of the invention. Any number of transmitting antennas and receiving antennas are in the scope of the invention. Further, any combination of number of antennas are within the scope of the invention. Still further, it is not necessary that the number of transmitting antennas equal the number of receiving antennas. Again, the present embodiment is merely exemplary and is not limiting of the invention.

Base station 904 may include first receiving antenna 922 and second receiving antenna 924 coupled to receive subset of sub-carriers from first wireless signal 951 and second wireless signal 952 respectively. In an embodiment, first wireless signal 951 and second wireless signal 952 may arrive at different times through different propagation paths to form a multi-path signal.

In an embodiment, subset of sub-carriers from mobile unit 902 may be spread with a 4-bit pilot Walsh code 932, where the 4-bit pilot Walsh code 932 may correspond to pilot Walsh code 232 described in FIG. 2 above. In an embodiment, subset of sub-carriers transmitted from first transmitting antenna 926 may include the 4-bit pilot Walsh code 932 in a first set of alternating time blocks 940, and subset of sub-carriers transmitted from second transmitting antenna 928 may include the 4-bit pilot Walsh code 932 in a second set of alternating time blocks 942, where the first set of alternating time blocks 940 are interleaved with the second set of alternating time blocks 942.

Each first set of alternating time blocks 940 and second set of alternating time blocks 942 include separate time blocks (numbered sequentially 1,2,3 . . . etc. as shown). The 4-bit pilot Walsh code 932 may be interleaved as shown, for example, by including 4-bit Walsh code 932 in odd numbered time blocks for transmission from first transmitting antenna 926, and including 4-bit Walsh code 932 in even numbered time blocks for transmission from second transmitting antenna 928.

Multiple antennas may be used as shown in FIG. 9 for spatial diversity (making a signal more robust, where data less likely to be corrupted) and allowing a higher data rate (increase the throughput). The alternating pilot signal sequence shown may be utilized to support multiple antennae for multiple in multiple output (MIMO) antenna configurations. MIMO enables base station 904 to estimate a channel from different transmit antenna based on pilot structure described. The invention is not limited to the 4-bit pilot Walsh code 932. Any size Walsh code and any scheme of interleaving is encompassed in the invention. Further, the use of any number of antennae for the mobile unit 902 or the base station 904 is encompassed in the scope of the invention.

Figure 10:
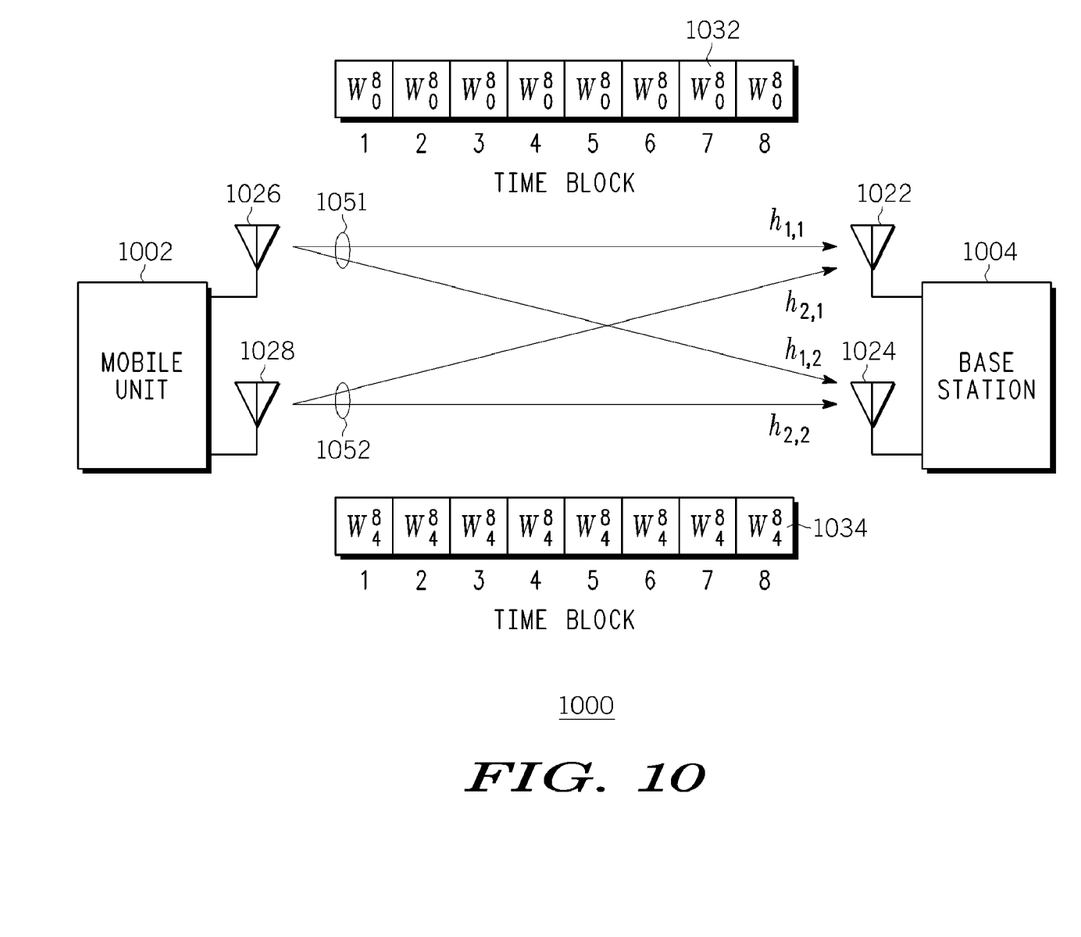
FIG. 10 representatively illustrates a wireless network in accordance with another exemplary embodiment of the present invention.

FIG. 10 representatively illustrates a wireless network 1000 in accordance with another exemplary embodiment of the present invention. Wireless network 1000 may include at least one mobile unit 1002 wirelessly coupled to a base station 1004. The embodiment, of FIG. 10 illustrates a pilot signal design for multiple antenna transmission and reception, which is an optional embodiment of the invention. Mobile unit may include first transmitting antenna 1026 and a second transmitting antenna 1028 coupled to transmit first wireless signal 1051 and second wireless signal 1052 respectively. First wireless signal 1051 and second wireless signal 1052 may include subset of sub-carriers as described above.

In multiple antenna transmission as shown in FIG. 10, signals from different transmitting antennas can be space-time coded to provide more diversity (as in transmit diversity, different antennas transmit same data) or provide higher throughput (as in Multiple Input Multiple Output (MIMO) antenna configurations where different antennas transmit different data). In the present embodiment, separate pilot signals from different antennas are needed in order for the base station receiver to estimate channel associated each transmit-receive antenna pair. Although two antennas are shown for both the mobile unit 1002 and the base station 1004, this is not limiting of the invention. Any number of transmitting antennas and receiving antennas are in the scope of the invention. Further, any combination of number of antennas are within the scope of the invention. Still further, it is not necessary that the number of transmitting antennas equal the number of receiving antennas. Again, the present embodiment is merely exemplary and is not limiting of the invention.

Base station 1004 may include first receiving antenna 1022 and second receiving antenna 1024 coupled to receive subset of sub-carriers from first wireless signal 1051 and second wireless signal 1052 respectively. In an embodiment, first wireless signal 1051 and second wireless signal 1052 may arrive at different times through different propagation paths to form a multi-path signal.

In an embodiment, subset of sub-carriers from mobile unit 1002 may be spread with a first 8-bit pilot Walsh code 1032 and a second 8-bit pilot Walsh code 1034, where the 8-bit pilot Walsh codes may correspond to pilot Walsh code 232 described in FIG. 2 above. In an embodiment, the subset of sub-carriers transmitted from first transmitting antenna 1026 includes the first 8-bit pilot Walsh code 1032, and the subset of sub-carriers transmitted from the second transmitting antenna 1028 includes the second 8-bit Walsh code 1034. The 8-bit pilot Walsh codes shall be orthogonal to the 4-bit Walsh codes for data spreading.

Multiple antennas may be used as shown in FIG. 10 for spatial diversity (making a signal more robust, where data less likely to be corrupted) and allowing a higher data rate (increase the throughput). The dual Walsh code signal sequence shown may be utilized to support multiple antennae for multiple in multiple output (MIMO) antenna configurations. MIMO enables base station 1004 to estimate a channel from different transmit antenna based on pilot structure described. The invention is not limited to the 8-bit pilot Walsh codes shown. Any size Walsh code and any scheme of interleaving is encompassed in the invention. Further, the use of any number of antennae for the mobile unit 1002 or the base station 1004 is encompassed in the scope of the invention.

Figure 11:
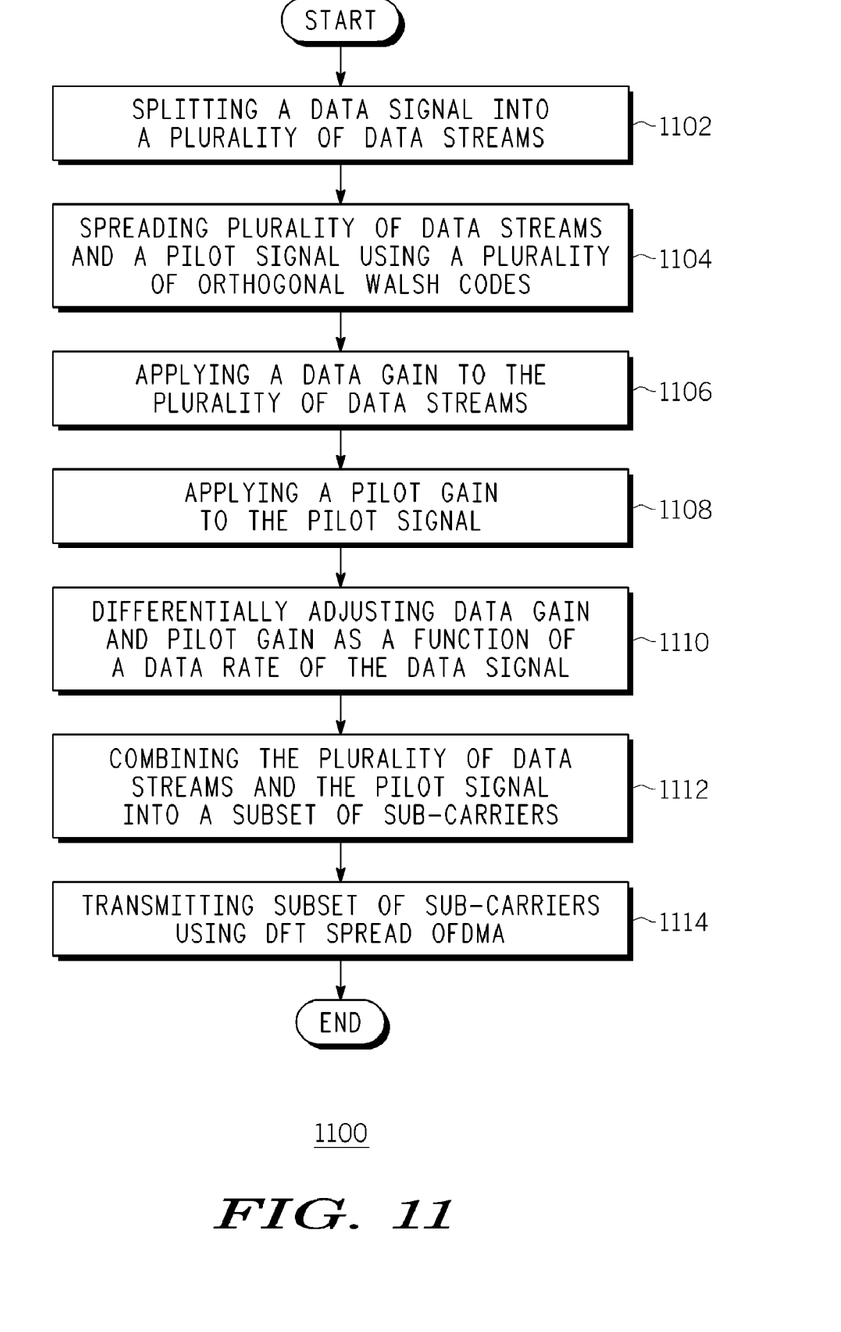
FIG. 11 representatively illustrates a flow chart in accordance with an exemplary embodiment of a method of the invention.

FIG. 11 representatively illustrates a flow chart 1100 in accordance with an exemplary embodiment of a method of the invention. In step 1102, in a mobile unit, a data signal is split into a plurality of data streams. In step 1104, the plurality of data streams and a pilot signal are spread using a plurality of orthogonal Walsh codes. In step 1106, a data gain is applied to the plurality of data streams, and in step 1108, a pilot gain is applied to the pilot signal. In step 1110, the data gain and the pilot gain are differentially adjusted as a function of the data rate of the data signal. In step 1112, the plurality of data streams and the pilot signal are combined into a subset of sub-carriers. In step 1114, the subset of sub-carriers are transmitted to a base station over a reverse link using DFT spread OFDMA or IFDMA.

The apparatus and method of the invention has the benefit of a pilot signal and data signal appearing on the same subset of sub-carriers, which avoids the throughput drain when the number of users increases, particularly when there exists a significant number of low data rate users. Another benefit is that the mobile unit is able to transmit continuously, which avoids spurious emissions that can interfere with hearing aids during a voice connection. Yet another benefit is that the pilot gain is easily adjustable based on the data rate, which allows optimal allocation of pilot power to achieve desired channel estimation quality (with minimum sufficient pilot power) and maximize wireless link reliability (by maximum possible data signal power).

Still further benefits include little or no multiple access interference (MAI) because each mobile unit is using a different subset of sub-carriers, unlike CDMA where signals from each user are distributed about the available bandwidth. Also, because of cyclic prefix insertion, there is no interblock interference, thereby minimizing multi-path interference.

In the foregoing specification, the invention has been described with reference to specific exemplary embodiments. However, it will be appreciated that various modifications and changes may be made without departing from the scope of the present invention as set forth in the claims below. The specification and figures are to be regarded in an illustrative manner, rather than a restrictive one and all such modifications are intended to be included within the scope of the present invention. Accordingly, the scope of the invention should be determined by the claims appended hereto and their legal equivalents rather than by merely the examples described above.

For example, the steps recited in any method or process claims may be executed in any order and are not limited to the specific order presented in the claims. Additionally, the components and/or elements recited in any apparatus claims may be assembled or otherwise operationally configured in a variety of permutations to produce substantially the same result as the present invention and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

We claim:

1. A method of wireless transmission from a mobile unit to a base station, comprising:
   multiplexing a pilot signal and a data signal, wherein the data signal operates at a data rate, comprising:
   splitting the data signal into a plurality of data streams;
   spreading the plurality of data streams and the pilot signal using plurality of orthogonal Walsh codes;
   applying a data gain to the plurality of data streams;
   applying a pilot gain to the pilot signal, wherein the data gain and the pilot gain are a function of the data rate such that increasing the data rate causes the pilot gain to decrease and the data gain to increase and decreasing the data rate causes the pilot gain to increase and the data gain to decrease;
   combining the plurality of data streams and the pilot signal into a multiplexed signal containing both the pilot signal and the data signal;
   allocating the multiplexed signal to a subset of sub-carriers; and
   transmitting the subset of sub-carriers using Discrete Fourier Transform Spread OFDMA.

2. The method of claim 1, wherein the subset of sub-carriers is localized within a frequency domain.

3. The method of claim 1, wherein the subset of sub-carriers is substantially uniformly distributed about a frequency domain.

4. The method of claim 3, wherein transmitting comprises transmitting using IFDMA.

5. The method of claim 1, wherein transmitting comprises at least one of performing Inverse Fast Fourier Transform (IFFT) on the subset of sub-carriers and performing a Fast Fourier Transform (FFT) on the subset of sub-carriers.

6. The method of claim 1, wherein combining into the subset of sub-carriers comprises code multiplexing the plurality of data streams and the pilot signal into the subset of sub-carriers.

7. A receiver coupled to receive a subset of sub-carriers transmitted from a mobile unit using Discrete Fourier Transform Spread OFDMA, comprising:
   a filter coupled to extract the subset of sub-carriers, wherein the subset of sub-carriers comprise a multiplex signal that contains a plurality of data streams multiplexed with a pilot signal using a plurality of orthogonal Walsh codes wherein the plurality of data streams comprise a data rate and wherein a pilot gain applied to the pilot signal and a data gain applied to the plurality of data streams are a function of the data rate such that increasing the data rate causes the pilot gain to decrease and the data gain to increase and decreasing the data rate causes the pilot gain to increase and the data gain to decrease;
   a Fast Fourier Transform FFT unit coupled to transform the subset of sub-carriers into a frequency domain;
   an Inverse Fast Fourier Transform (IFFT) coupled to transform the subset of sub-carriers into a time domain; and
   a rake receiver coupled to extract at least one of the plurality of data streams from the multiplexed signal.

8. The receiver of claim 7, wherein the receiver further comprises a first receiving antenna and a second receiving antenna, wherein the first receiving antenna and the second receiving antenna are coupled to receive the subset of sub-carriers from a first transmitting antenna and a second transmitting antenna on the mobile unit.

9. The receiver of claim 8, wherein the subset of sub-carriers are spread with a 4-bit pilot Walsh code, wherein the subset of sub-carriers transmitted from the first transmitting antenna include the 4-bit pilot Walsh code in a first set of alternating time blocks, wherein the subset of sub-carriers transmitted from the second transmitting antenna include the 4-bit pilot Walsh code in a second set of alternating time blocks, wherein the first set of alternating time blocks are interleaved with the second set of alternating time blocks.

10. The receiver of claim 8, wherein the subset of sub-carriers are spread with a first 8-bit pilot Walsh code and a second 8-bit pilot Walsh code, wherein the subset of sub-carriers transmitted from the first transmitting antenna includes the first 8-bit pilot Walsh code, and wherein the subset of sub-carriers transmitted from the second transmitting antenna includes the second 8-bit pilot Walsh code.

11. The receiver of claim 7, wherein the subset of sub-carriers is localized within a frequency domain.

12. The receiver of claim 7, wherein the subset of sub-carriers is substantially uniformly distributed about a frequency domain.

13. The receiver of claim 12, wherein the subset of sub-carriers are transmitted using IFDMA.

14. A method of wireless transmission, comprising:
- code multiplexing a pilot signal and a data signal, comprising:
    - splitting the data signal into a plurality of data streams;
    - spreading the plurality of data streams and the pilot signal using plurality of orthogonal Walsh codes;
    - differentially adjusting a data gain applied to the plurality of data streams and a pilot gain applied to the pilot channel as a function of a data rate of the data signal such that increasing the data rate causes the pilot gain to decrease and the data gain to increase and decreasing the data rate causes the pilot gain to increase and the data gain to decrease;
    - combining the plurality of data streams and the pilot signal into a multiplexed signal containing both the plurality of data streams and the pilot signal
    - allocating the multiplexed signal to a subset of sub-carriers; and
- transmitting the subset of sub-carriers using Discrete Fourier Transform Spread OFDMA.

15. The method of claim 14, wherein the subset of sub-carriers is transmitted from a mobile unit to a base station over a reverse link.

16. The method of claim 14, wherein the subset of sub-carriers is localized within a frequency domain.

17. The method of claim 14, wherein the subset of sub-carriers is substantially uniformly distributed about a frequency domain.

18. The method of claim 17, wherein transmitting comprises transmitting using IFDMA.

19. A receiver coupled to receive a subset of sub-carriers transmitted from a mobile unit using Discrete Fourier Transform Spread OFDMA, comprising:
- a filter coupled to extract the subset of sub-carriers, wherein the subset of sub-carriers comprise a multiplexed signal containing a plurality of data streams multiplexed with a pilot signal using a plurality of orthogonal Walsh codes wherein the plurality of data streams comprise a data rate and wherein a pilot gain applied to the pilot signal and a data gain applied to the plurality of data streams are a function of the data rate such that increasing the data rate causes the pilot gain to decrease and the data gain to increase and decreasing the data rate causes the pilot gain to increase and the data gain to decrease;
- a Fast Fourier Transform FFT unit coupled to transform the subset of sub-carriers into a frequency domain;
- an Inverse Fast Fourier Transform (IFFT) coupled to transform the subset of sub-carriers into a time domain;
- a channel estimator coupled to estimate channels in the time domain; and
- a frequency domain equalizer coupled to equalize the subset of sub-carriers in the frequency domain.

* * * * *